Jan. 27, 1925. 1,524,112
A. SOMMER
STATIONARY VALVE FOR PUMPS
Filed Dec. 1, 1923
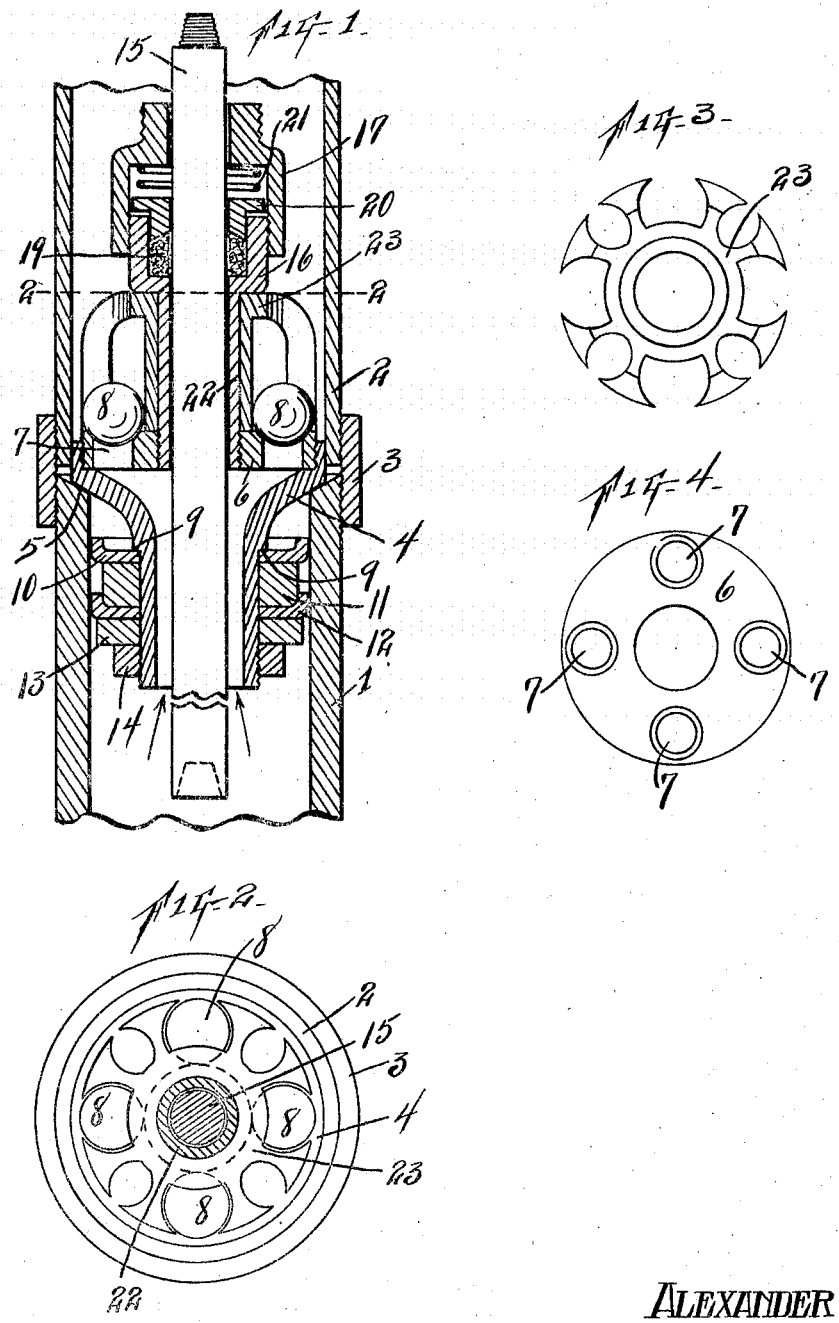
Inventor
ALEXANDER SOMMER
By A. L. Jackson
Attorney Patented Jan. 27, 1925.

1,524,112

UNITED STATES PATENT OFFICE.

ALEXANDER SOMMER, OF MORAN, TEXAS.

STATIONARY VALVE FOR PUMPS.

Application filed December 1, 1923. Serial No. 677,929.

*To all whom it may concern:*

Be it known that I, ALEXANDER SOMMER, a citizen of the United States, residing at Moran, in the county of Shackelford and State of Texas, have invented certain new and useful Improvements in Stationary Valves for Pumps, of which the following is a specification.

My invention relates to stationary valves and more particularly to stationary valves for pumps; and the object is to improve the workings of pumps for oil and other wells by making more efficient valves and improved sealing means. Other objects and advantages will be more fully explained in the following description and the invention will be more particularly pointed out in the claims.

Reference is had to the accompanying drawings which form a part of this application.

Fig. 1 is a vertical section of the working barrel and the casing connected thereto, showing the working parts therein. Fig. 2 is a horizontal section, taken on the line 2—2 of Fig. 1. Fig. 3 is a plan view of the cage for the ball valves. Fig. 4 is a plan view of the seat for the ball valves.

Similar characters of reference are used to indicate the same parts throughout the several views.

A working barrel 1 is provided and a casing 2 is connected thereto by a collar or coupling 3. The working barrel has a relatively thick wall, thicker than the casing 1. This makes provision for supporting the valve or making the valve stationary. A valve seat support 4 is carried on the shoulder 5 which is formed by the inner part of the wall of the working barrel 1. The support 4 is flared at the upper end to receive the valve seat 6 which is screwed into the top of the support 4. This seat 6 is provided with a plurality of water passages or oil passages 7 which are to be closed by the ball valves 8. The reduced portion of the support 4 has an annular exterior shoulder 9 and a cup 10 of flexible material is held against this shoulder by a washer 11. A cup 12 of flexible material is held against the washer 11 by a washer 13 and these washers and cups are all held in place on the reduced portion of the support 4 by a nut 14. The support 4 thus has a seal-tight fit in the working barrel 1. The valve stem 15 moves through a packing gland which is composed of the casing member 16 and a casing member 17 and packing 18 and plug cover 20 and a spring 21 to hold the cover 20 in place on the packing 19. The casing member 16 has a sleeve 22 extending downwardly therefrom and is screwed into the seat 6 so that the packing gland, seat 6, and support 4 are rigidly connected together. A cage 23 for the ball valves 8 is held in place by the packing gland.

The function of the part 4 is to support the valve seat 6 and cage 23 and thus make the valve stationary. The liquid passes up through the support 4 and through the valve seat 6. When the liquid is once above the valves 8, it does not go down again, and the sucker rod 15 operates freely through the packing gland and when the sucker rod goes down it forces the piston (not shown) down and thus creates a vacuum above the piston and below the stationary valve. This will aid the oil or other liquid to run in above the piston. Unlike other pumps, the oil or other liquid never has any motion downward. The cups 10 and 12 tend to steady the valve during operation. Actual use of the valve under service conditions has demonstrated the high efficiency of the valve.

What I claim is,—

1. In a pump provided with a sucker-rod and a casing; a working barrel included as a part of said casing and provided with an annular interior shoulder, a support resting on said shoulder provided with an opening therethrough for the said sucker-rod and for the passage of liquid having an annular shoulder in the upper end and interiorly threaded above said shoulder, a valve seat screwed into said support and provided with liquid passages therethrough, a packing gland about said sucker-rod screwed into said seat, and plurality of valves for opening and closing said passages.

2. In a pump provided with a sucker-rod and a casing; a working barrel included as a part of said casing provided with an annular interior shoulder, a support resting on said shoulder and provided with a passage for liquid and said sucker-rod, a valve seat rigid with said support and provided with liquid passages therethrough, a packing gland about said sucker-rod provided with a sleeve rigid with said valve seat, a plurality of valves for opening and closing said passages, and a cage for said valves held in place by said packing gland.

In testimony whereof, I set my hand, this 8th day of October, 1923.

ALEXANDER SOMMER.